(12) United States Patent
Podlaseck et al.

(10) Patent No.: US 8,892,709 B2
(45) Date of Patent: Nov. 18, 2014

(54) EARLY GENERATION OF SERVICE REQUESTS

(75) Inventors: Mark E. Podlaseck, Kent, CT (US); Larisa Shwartz, Scarsdale, NY (US); Maja Vukovic, New York, NY (US)

(73) Assignee: International Business Machines Corporation, Armonk, NY (US)

(*) Notice: Subject to any disclaimer, the term of this patent is extended or adjusted under 35 U.S.C. 154(b) by 261 days.

(21) Appl. No.: 13/224,128

(22) Filed: Sep. 1, 2011

(65) Prior Publication Data

US 2013/0060923 A1 Mar. 7, 2013

(51) Int. Cl.
*G06F 15/173* (2006.01)
*G06F 17/30* (2006.01)
*G06Q 10/10* (2012.01)

(52) U.S. Cl.
CPC .............. *G06F 17/30* (2013.01); *G06Q 10/107* (2013.01); *G06Q 10/109* (2013.01)
USPC ........................... 709/223; 709/224; 709/225

(58) Field of Classification Search
CPC .................................................... G06F 17/30
USPC ......................................... 709/223, 224, 225
See application file for complete search history.

(56) References Cited

U.S. PATENT DOCUMENTS

| | | | |
|---|---|---|---|
| 6,516,312 B1* | 2/2003 | Kraft et al. ..................... 707/610 |
| 7,653,812 B2* | 1/2010 | Levin et al. .................... 713/168 |
| 7,716,077 B1* | 5/2010 | Mikurak ...................... 705/7.12 |
| 8,166,013 B2* | 4/2012 | Bandaru et al. ............... 707/705 |
| 2002/0068554 A1* | 6/2002 | Dusse ........................... 455/419 |
| 2007/0250904 A1* | 10/2007 | Waller ............................... 726/1 |
| 2007/0280462 A1* | 12/2007 | Neece ....................... 379/201.01 |
| 2008/0082691 A1* | 4/2008 | Hochwarth et al. .......... 709/246 |
| 2010/0211868 A1 | 8/2010 | Karmarkar et al. |
| 2010/0222021 A1* | 9/2010 | Balsan et al. ................. 455/406 |
| 2010/0246797 A1 | 9/2010 | Chavez et al. |
| 2010/0287050 A1* | 11/2010 | Jones et al. ................ 705/14.58 |
| 2010/0293560 A1 | 11/2010 | Bland et al. |
| 2011/0029636 A1 | 2/2011 | Smyth et al. |
| 2012/0143864 A1* | 6/2012 | Quigley et al. ............... 707/736 |

FOREIGN PATENT DOCUMENTS

WO WO 2006065546 A2 * 6/2006

OTHER PUBLICATIONS getsatsifaction.com, mining feedback search results accessed Nov. 3, 2011, 1 page, www.getsatsifaction.com.
Zendesk.com, Turn Tweets and Comments Into Actionable Items, Dec. 2010, accessed Nov. 3, 2011, 5 pages, http://www.zendesk.com/blog/turn-tweets-and-comments-into-actionable-items.
"Gartner Highlights Four Ways in Which Enterprises Are Using Twitter," Gartner Newsroom, Mar. 2009, accessed Nov. 3, 2011, 3 pages, http://www.gartner.com/it/page.jsp?id=920813.
"The Who, Why, and How of Twitter," BuySellAds, accessed Nov. 3, 2011, 1 page, http://www.netokracija.com/wp-content/uploads/2011/06/BuySellAds_TwitterUsers.png.

* cited by examiner

*Primary Examiner* — Oleg Survillo
*Assistant Examiner* — Janakkumar Patel
(74) *Attorney, Agent, or Firm* — Yee & Associates, P.C.; Louis J. Percello (57) ABSTRACT

A method, data processing system, and computer program product for managing services. A computer identifies information in a number of discussions in a discussion forum. The computer determines that the information is associated with a service. The computer then generates a new request for the service in an absence of a current request for the service.

11 Claims, 5 Drawing Sheets

| TIMESTAMP AND SOURCE | CONTENT | |
|---|---|---|
| 4:04 / BLOG A<br>CHRIS@COMPANY.COM | THE APPLICATION SEEMS<br>TO BE RUNNING SLOW... | 302 |
| 4:17 / BLOG A<br>TOM@COMPANY.COM | I HAD THE SAME ISSUE LAST NIGHT.<br>COULD BE THE LOAD ON THE SYSTEM? | |
| 4:50 / BLOG B<br>PETER@COMPANY.COM | IT'S BEEN A SLOW<br>DAY TODAY... | |
| 5:51 / BLOG B<br>JANE@COMPANY.COM | THE APPLICATION HAD ISSUES WITH THE<br>SERVER. THE MEMORY NEEDS AN UPGRADE. | |
| 6:07 / BLOG A<br>SERVICE@COMPANY.COM | MEMORY SERVER UPGRADE<br>IS SCHEDULED FOR 7PM | 304 |
| 7:07 / BLOG A<br>SERVICE@COMPANY.COM | SERVER MEMORY<br>UPGRADE COMPLETED | 306 |
| 7:13 / BLOG A<br>CHRIS@COMPANY.COM | THE APPLICATION IS FINE NOW. IT LOOKS<br>LIKE THE MEMORY UPGRADE WORKED! | 308 |

EARLY GENERATION OF SERVICE REQUESTS

BACKGROUND

1. Field

The present disclosure relates generally to managing a service and, in particular, to a method and system for early detection and generation of service requests. Still more particularly, the present disclosure relates to a method and system for generating a service request based on information identified in a discussion forum.

2. Description of the Related Art

Today's service providers have different ways of obtaining the information necessary to effectively manage their services for their customers. Different methods may be used to obtain new customers, retain current customers, and improve on the quality of services offered. In today's competitive marketplace, service providers are constantly searching for ways to efficiently identify potential customers and to improve response time to meet customers' needs.

Some service providers manage their services by responding to service requests. A service request includes information that informs the service provider about details regarding the service needed by a customer. For example, an information technology service that provides services for computers may receive a service request from a customer who is experiencing an unusually slow response time from a software application. The service request may include information about the customer's computer, such as the model, amount of memory, and processor speed. The customer may provide the service request in a variety of ways, such as by phone or email.

Service providers that implement service requests may require a quick identification of relevant information for providing the appropriate service to a customer, in order to meet the service level agreements (SLAs). A typical service request often includes only a portion of the information necessary for a service provider to respond with an appropriate service.

Additionally, relying on customers to provide service requests to address problems has disadvantages. For example, a problem that requires service may exist for a considerable amount of time before a customer creates a service request to fix the problem. Moreover, other potential customers may have been experiencing the problem for a considerable amount of time. For example, a software application hosted by a server and shared by multiple users over a network may experience a decrease in performance for several hours before a customer finally creates a service request to inform a service provider of the problem.

SUMMARY

The different illustrative embodiments provide a method, data processing system, and computer program product for managing services. A computer identifies information in a number of discussions in a discussion forum. The computer determines that the information is associated with a service. The computer then generates a new request for the service in an absence of a current request for the service.

DETAILED DESCRIPTION

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, apparatus (systems) and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are processed on the computer or other programmable apparatus provide processes for implementing the functions/acts specified in the flowchart and/or block diagram block or blocks.

The different illustrative embodiments recognize and take into account that currently, the ability for service providers to respond to service requests depends on customers for providing information in a timely manner. The different illustrative embodiments recognize and take into account that generating a service request based on information identified in a discussion forum may be desirable.

Thus, the different illustrative embodiments provide a method, data processing system, and computer program product for managing services. A computer identifies information in a number of discussions in a discussion forum. The computer determines that the information is associated with a service. The computer then generates a new request for the service in an absence of a current request for the service.

Figure 1:
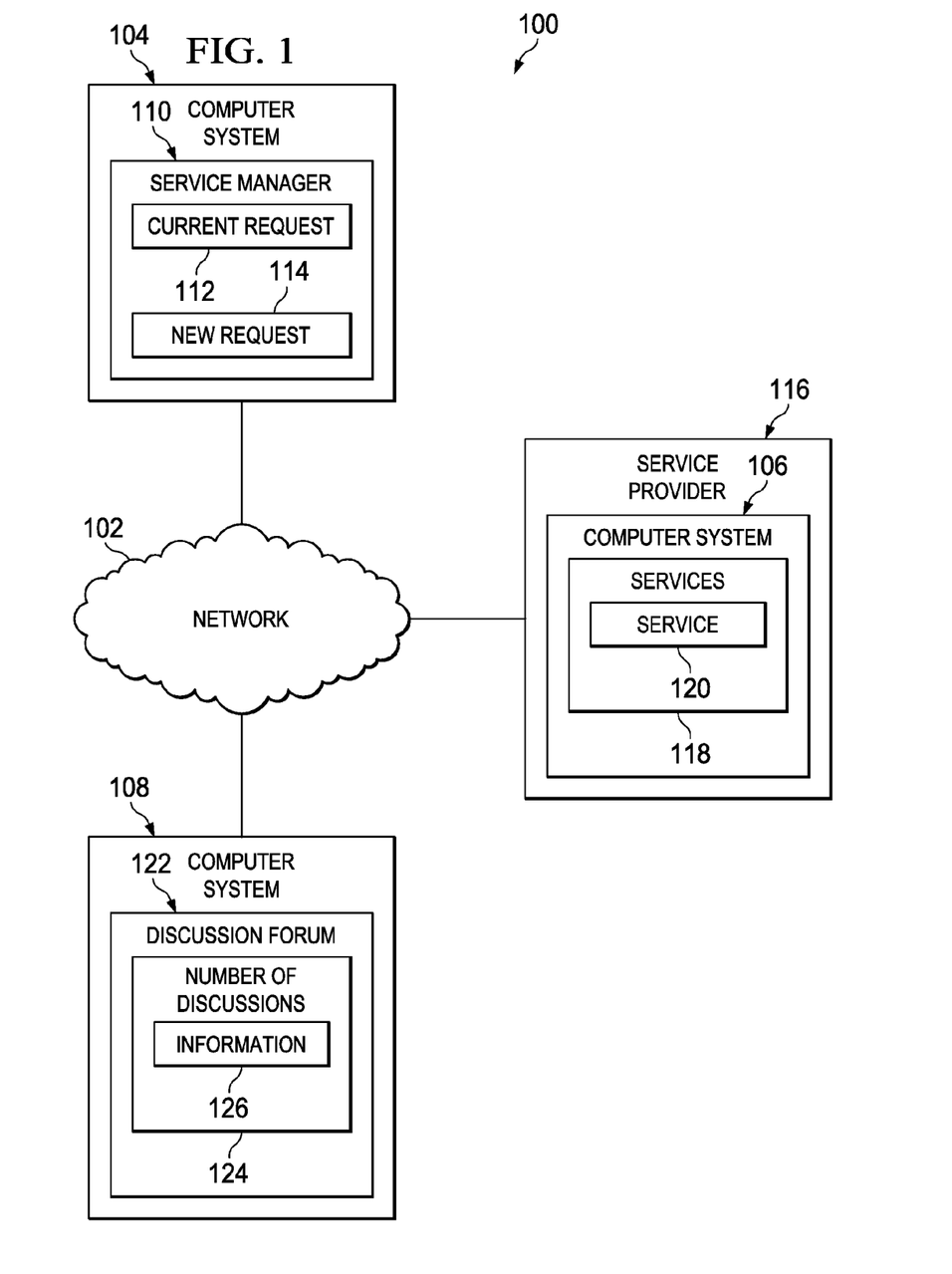
FIG. 1 is an illustration of a network of data processing systems in which illustrative embodiments may be implemented.

FIG. 1 depicts an illustration of a network of data processing systems in which illustrative embodiments may be implemented. Network data processing system 100 is an example of computer systems in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, computer system 104, computer system 106, and computer system 108 connect to network 102. Computer system 104, computer system 106, and computer system 108 may comprise one or more computers, server computers, client computers, personal devices, or any other systems capable of running program code.

In the depicted example, computer system 104 includes service manager 110 with an associated current request 112 and new request 114 that represent requests for services that are provided by service provider 116. Service manager 110 may be a server or a combination of hardware and software capable of managing requests for services.

Furthermore, in the depicted example, service provider 116 may include computer system 106 that includes services 118. Services 118 includes service 120, which may correspond to current request 112 or new request 114. Services 118 may be a server or a combination of hardware and software capable of providing service 120 or indicating that service 120 needs to be provided by service provider 116. For example, service 120 may be a software application that installs software onto another computer system. As another example, service 120 may represent a service performed by a person and any other entities suitable for performing service 120 associated with service provider 116.

In these illustrative examples, a service provider such as service provider 116 means an a person, a machine, or a combination of a person and a machine that provides service 120 and a service such as service 120 means a service performed by a service provider such as service provider 116 that fixes a problem or addresses an issue. The problem or issue may be identified in a service request such as current request 112 and new request 114.

In these illustrative examples, service 120 may provide an indication to service provider 116 that service 120 needs to be performed on an item. For example, service 120 may indicate to service provider 116 that memory chips for another computer system need to be replaced. Thus, service 120 may be performed by a person or another entity outside of computer system 106 or in combination with computer system 106. Service 120 may be performed by a person, a machine, or a combination of a person and a machine. Service 120 may include providing, removing, replacing, or modifying physical objects and materials, such as replacing memory chips in a computer. Thus, service 120 may be performed on an item such as a computer system, software application, website, machine, or any other object suitable for receiving the service.

In the depicted example, computer system 108 includes discussion forum 122 with number of discussions 124 that contains information 126. In these illustrative examples, when "number" is used with reference to discussions, "number" means one or more discussions. For example, number of discussions 124 means one or more discussions. Furthermore, a discussion may include text, letters, characters, numbers, graphical information, or any other form of information stored on or capable of being stored on computer system 108.

Discussion forum 122 may be a blog, microblog, online discussion forum, website, social networking application, internet relay chat, email thread, and any other application suitable for use with number of discussions 124. Discussion forum 122 may convey information 126. Convey 126 means to distribute, display, store, transmit, or communicate. Users of discussion forum 122 use discussions 124 to provide information 126 or a portion of information 126. Information 126 may include text, letters, characters, numbers, graphical information, and any other form of information in a discussion in number of discussions 124. Information may include posts by users of the discussion forum 122 or information posted by a user of the discussion forum 122. In these illustrative examples, a "post" is information provided by a user to the discussion forum 122.

In these illustrative examples, "posting" to a discussion forum 122 is the act of providing information to discussion forum 122. In these illustrative examples, providing information to discussion forum 122 may include sending the information to discussion forum 122 via a networking protocol such as SMTP, SMS, text message, or other protocol suitable for transmitting information to discussion forum 122.

In these illustrative examples, users of discussion forums such as discussion forum 122 may include people such as item owners, item users, discussion forum administrators, and may also include computers and software suitably configured to provide information to the discussion forum about an item that needs service. For example, computers and software may send information to discussion forum 122 to that indicates a problem exists with an item that requires service. The information sent to discussion forum 122 may include metrics and other problem details. In some illustrative examples, the information send by computers and software may be send to discussion forum 122 in response to a user request.

In some illustrative examples, service manager 110 identifies information 126 and determines whether information 126 is associated with service 120. For example, information 126 may include complaints that a software application is running slowly or that the software application is creating error messages indicating that there are memory problems. If service manager 110 determines that information 126 is associated with service 120, then service manager 110 generates new request 114 for service 120 if service manager 110 determines that current request 112 for service 120 does not exist.

In some illustrative examples, after service manager 110 determines that information 126 is associated with service 120, service manager 110 determines if the information 126 is additional information related to current request 112. If the information 126 is additional information related to current request 112, then service manager 110 updates current request 112 with the additional information. If service manager 110 determines if the information 126 is not related to current request 112, service manager 110 creates new request 114. In some illustrative embodiments, after sending new request 114 to service provider 116, service provider 116 may provide information to discussion forum 126 indicating that new request 114 is another request for an already existing current request 112. The information may include additional information regarding the status of the current request 112.

In some illustrative examples, service manager 110 requests a user of discussion forum 112 for additional information and then generates new request 114 based upon the additional information provided by the user. The additional information may be provided in a variety of ways, such as posting on discussion forum 122, email, phone call, web form, text message, or other any other suitable communication method. In some illustrative embodiments, the steps of identifying information 126, determining that information 126 is associated with service 120, generating new request 114, and adding the additional information is performed throughout a lifecycle of providing the service for the item. Moreover, the steps may be performed responsive to additional information being added to the discussion forum and performed within a threshold of time suitable for responding to the additional information In some illustrative examples, new request 114 for service 118 is generated if service manager 110 determines that service 118 is authorized and cancels new request 114 if service manager 110 determines that service 118 is not authorized. Determining if service 118 is authorized may include determining if a provider of service 118 authorizes service 118, determining if a recipient of service 118 authorizes service 118, or determining if an entity associated with providing or receiving service 118 authorizes service 118. Authorization may be provided or denied through any form of suitable communication such as email, phone call, web form, text message.

In some illustrative examples, information 126 may include information from an additional number of discussions in an additional number of discussion forums that exist on computer system 108 or on a number of additional computer systems.

If service manager 110 determines that current request 112 for service 120 does exist, then service manager 110 may not generate new request 114. In some illustrative examples, service manager instead replaces current request 112 with new request 114 or modifies current request 112 using additional information, such as information 126.

In some illustrative examples, information 126 indicates a problem exists that requires providing service 120 for an item. Service manager 110 may send information 126 to service provider 116. Service provider may then use information 126 to provide service 120.

Figure 2:
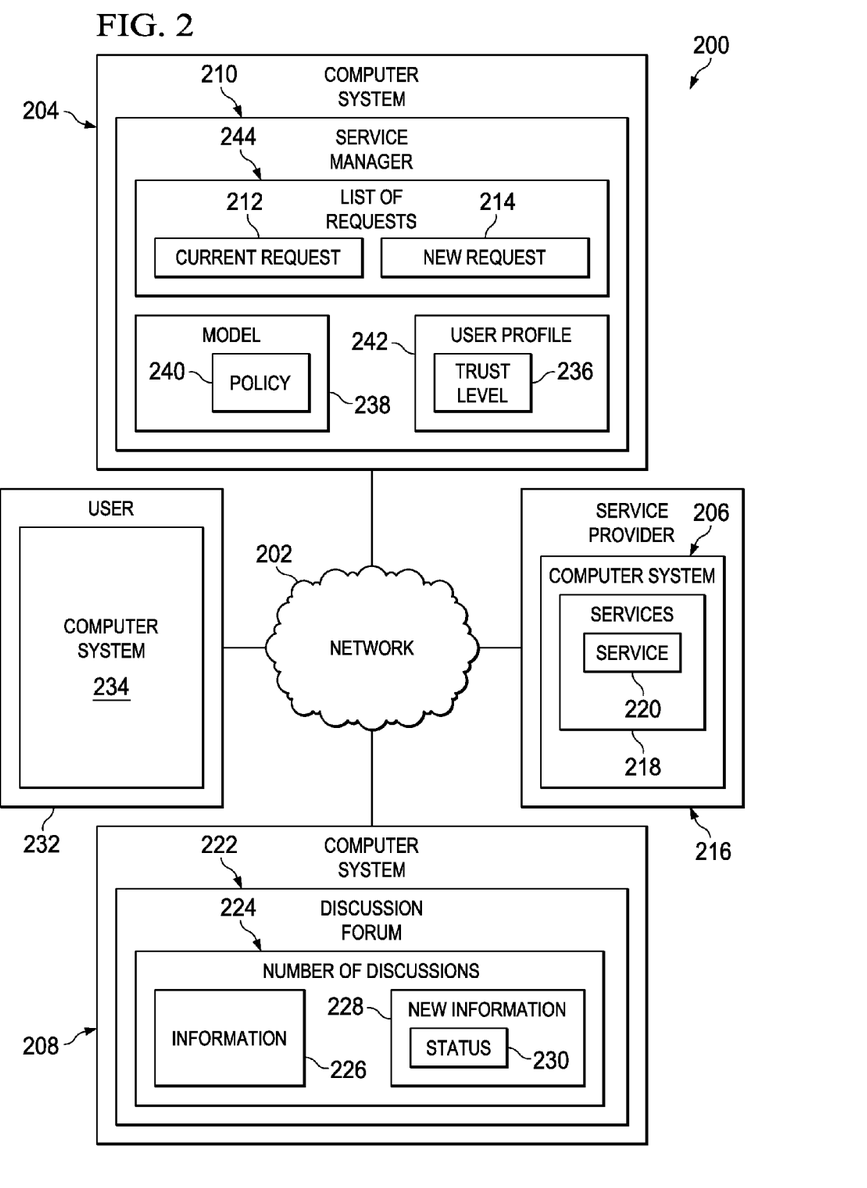
FIG. 2 is an illustration of a network of data processing systems in which illustrative embodiments may be implemented.

With reference now to FIG. 2, an illustration of network of data processing systems is depicted in accordance with an illustrative embodiment. Network data processing system 200 may be implemented in network data processing system 100. In some illustrative examples, network data processing system 200 may be implemented within a single computer. In some illustrative examples, network data processing system 200 may be implemented within a group of computers.

Network data processing system 200 contains network 202, such as, for example, network 102 in FIG. 1. In the depicted example, computer system 204, computer system 206, and computer system 208 connect to network 202. Computer system 204, computer system 206, and computer system 208 are examples of computer system 104, computer system 106, and computer system 108 in FIG. 1.

In the depicted example, computer system 204 includes service manager 210 with an associated current request 212 and new request 214 that represent requests for services that are provided by service provider 216. Service manager 210 may be a server or a combination of hardware and software capable of managing requests for services.

Furthermore, in the depicted example, service provider 216 may include computer system 206 that includes services 218. Services 218 includes service 220, which may correspond to current request 212 or new request 214. Services 218 may be a server or a combination of hardware and software capable of providing service 220 or indicating that service 220 needs to be provided by service provider 216. In some illustrative examples, service 220 may provide an indication to service provider 216 that service 220 needs to be performed by an entity other than services 218.

In the depicted example, computer system 208 includes discussion forum 222 with number of discussions 224 that contains information 226. In some illustrative examples, service manager 210 identifies information 226 and determines whether information 226 is associated with service 220. If service manager 210 determines that information 226 is associated with service 220, then service manager 210 generates new request 214 for service 220 if service manager 210 determines that current request 212 for service 220 does not exist. If service manager 210 determines that current request 212 for service 220 does exist, then service manager 210 may not generate new request 214. Furthermore, service manager 210 may add new information 228 to number of discussions 224. New information 228 may include status 230 of current request 212 or new request 214. In some illustrative examples, new information 228 may be added to at least one additional discussion forum 122.

In some illustrative examples, user 232 is a user of discussion forum 222 and uses computer system 234 to access discussion forum 222. Furthermore, service manager 210 may determine a trust level 236 for user 232. In some illustrative examples, trust level 236 is used to determine whether to generate new request 214. For example, if user 232 provided at least a portion of information 226 and if trust level 236 for user 232 exceeds a specified threshold, then new request 214 may be generated when service manager 210 determines that information 226 is associated with service 220. In some illustrative examples, trust level 236 may be selected for user 232 based upon a policy that uses information that was posted by user 232 in the past. For example, if user 232 has a history of posting reliable feedback and accurate information on discussion forum 222, then user 232 may be assigned a higher trust level 236 than other users that posted less reliable feedback or less accurate information. Additional factors may be used to determine trust level 236 for user 232, based on determined sentiment of user 232, a number of posts to discussion forum 222 made by user 232, a number of service requests made by user 232 that were resolved, quality of prior service requests, and trustworthiness of prior service requests. In these illustrative examples, the determined sentiment of a user means a particular word, phrase, emoticon, acronym, symbol and any other suitable information provided by a user which conveys the user's current attitude or demeanor.

Status 230 may include an indication that service 220 has been scheduled. In some illustrative embodiments, an indication that service 220 has been scheduled may instead be delivered to a user of discussion forum 222 via suitable communication such as email, phone call, web form, text message. The user receiving the indication may have originally posted information on discussion forum 222 related to service 220. Status 230 may include an indication that service 220 has been completed. In some illustrative embodiments, an indication that service 220 has been completed may instead be delivered to a user of discussion forum 222 via suitable communication such as email, phone call, web form, text message. The user receiving the indication may have originally posted information on discussion forum 222 related to service 220.

In some illustrative examples, information 226 indicates that service 220 was scheduled before determining that information 226 is associated with service 220. Thus, users of discussion forum 222 may be notified that service 220 has already been scheduled. Furthermore, information 226 may include information that was previously identified by service manager. Thus, information 226 may include information that was identified from previous discussions on discussion forum 222.

In some illustrative examples, model 238 is used to determine that information 226 is associated with service 220. Model 238 may include policy 240 for determining whether information 226 is associated with service 220 using a set of keywords related to the service. Policy 240 may also use a predictive analysis algorithm to identify future behavior of users and their social network.

In some illustrative examples, trust level 236 is included in user profile 242. User profile 242 may include additional attributes associated with user 232, such as a role of the user and history of the user. The role of the user and history of the user are additional factors that may be used to determine trust level 236 for user 232. In some illustrative examples, current request 212 and new request 214 are part of list of requests 244, which includes additional current requests and additional new requests. Therefore, current request 212 may be one of many requests.

In some illustrative examples, user 232 belongs to a user network, which is a group of users that are associated and related to user 232. For example, the group of users may be associated to user 232 because each user in the group of users belongs to a same network as user 232. For example, each user in the group of users may belong to the same social networking site as user 232. In some illustrative examples, service manager 210 may use the user network to predict behavior of the group of users.

In some illustrative examples, a template for a service request is represented as a triple <action, target, context>, that is to be customized following the processing of postings in discussion forum 222. The triple consists of the action that is to be performed on the target object, in the given context. Service manager 210 crawls over discussion forum 222 to extract relevant posts by using a domain-specific dictionary of common technical terms. Classification is then applied to each extracted post to group the posts based on a relation of each post to a potential service request. User attributes are extracted for each user of the extracted posts. As a result, service manager 210 generates subsets, also called clusters, of posts, by segregating each post by a role of the user associated with the post and an application context of the post.

In some illustrative examples, for each post in each of the clusters, further classification is performed to obtain a sentiment and nature of the post. The sentiment and nature is further used to update each user's trust level and user log of postings. Each user's social network may be exploited to predict users who are likely to comment to a post and a service request, and to determine who should be notified of any events related to the post and the service request. The template for the service request is then customized with information from the extracted posts. Each template is prioritized based on a trust level and a customer level of the user associated with the extracted post. The templates are then used to generate service requests.

Figure 3:
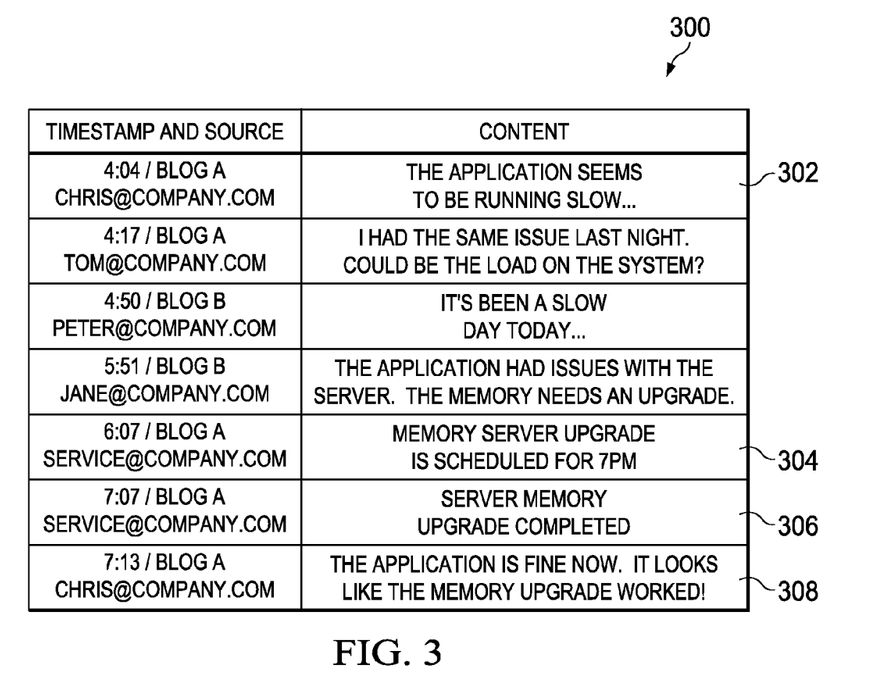
FIG. 3 is an illustration of a discussion in accordance with an illustrative embodiment.

With reference now to FIG. 3, an illustration of discussion is depicted in accordance with an illustrative embodiment. Discussion 300 is an example of a discussion containing information, such as information 226 in FIG. 2. For example, information 302 includes an indication that an application is running slow. Service manager 210 may determine that information 302 is associated with service 220. Service manager 210 may create new request 214 and add status 304 to discussion forum 222 to indicate that service 220 is scheduled. At a later point in time, service manager may add status 306 to discussion forum 222 to indicate that service 220 is completed. In some illustrative embodiments, information 308 is used to determine trust level 236 for a user that posted information 308.

Figure 4:
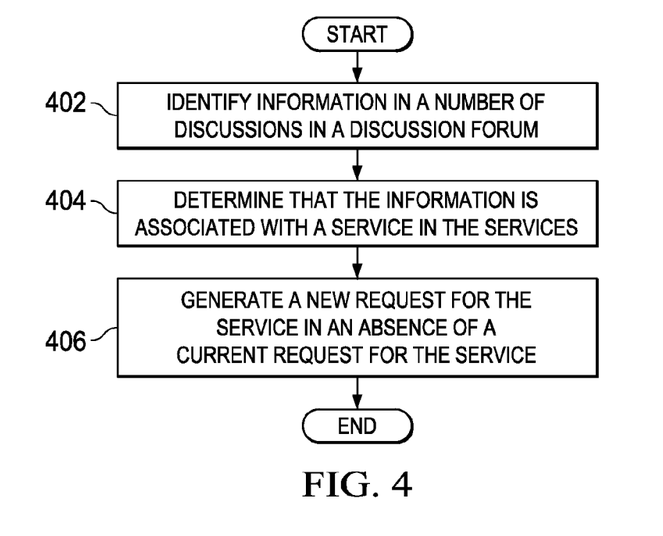
FIG. 4 is an illustration of a flowchart of a process for managing a service in accordance with an illustrative embodiment.

With reference now to FIG. 4, an illustration of a flowchart of a process for managing a service is depicted in accordance with an illustrative embodiment. The process illustrated in FIG. 4 may be implemented in a network of data processing systems, such network data processing systems 200 in FIG. 2.

The process begins by identifying information 226 in a number of discussions 224 in a discussion forum 222 (step 402). At step 404, service manager 210 determines that information 226 is associated with a service 220. The process then generates a new request 214 for the service 220 in an absence of a current request 212 for the service 220 (step 406). Thereafter, the process terminates.

Figure 5:
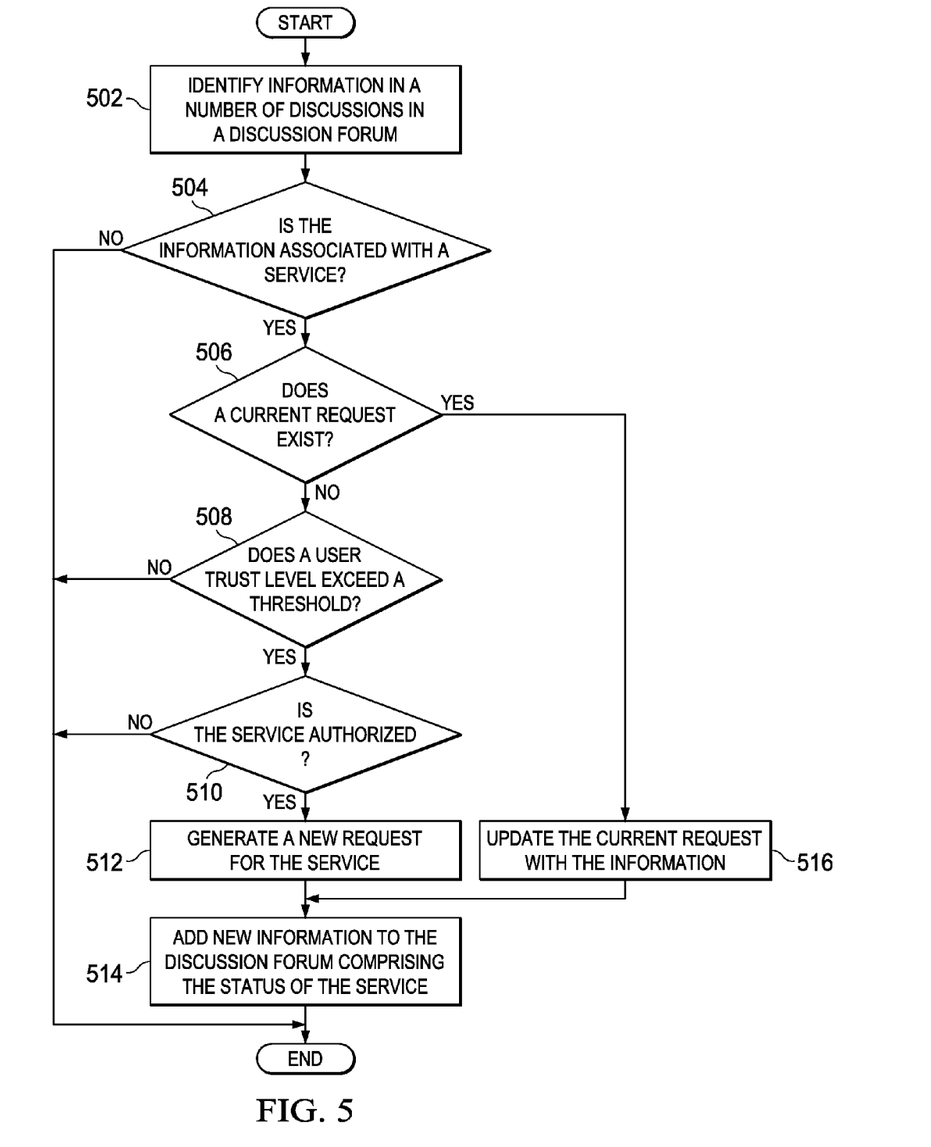
FIG. 5 is an illustration of a flowchart of a process for managing a service in accordance with an illustrative embodiment.

With reference now to FIG. 5, an illustration of a flowchart of a process for managing a service is depicted in accordance with an illustrative embodiment. The process illustrated in FIG. 5 may be implemented in a network of data processing systems, such network data processing systems 200 in FIG. 2.

The process begins by identifying information 226 in a number of discussions 224 in a discussion forum 222 (step 502). At step 504, service manager 210 determines whether information 226 is associated with a service 220. If information 226 is not associated with service 220, the process terminates. If information 226 is associated with service 220, the process determines whether a current request 212 for service 220 exists (step 506). If current request 212 for service 220 does not exist, the process determines whether a user trust level 236 exceeds a threshold (step 508). If user trust level 236 does not exceed a threshold, then the process terminates. If user trust level 236 does exceed a threshold, the process determines whether the service 220 is authorized (step 510). If the service 220 is not authorized, the process terminates. If the service 220 is authorized, the process generates a new request 214 for the service 220 (step 512). The process then adds new information 228 to the discussion forum 222 comprising the status 230 of the service 220 (step 514). Thereafter, the process terminates.

Returning now to step 506, if current request 212 for service 220 exists, the process updates current request 212 with information (step 516). The process then adds new information 228 to discussion forum 222 comprising status 230 of service 220 (step 514). Thereafter, the process terminates.

Figure 6:
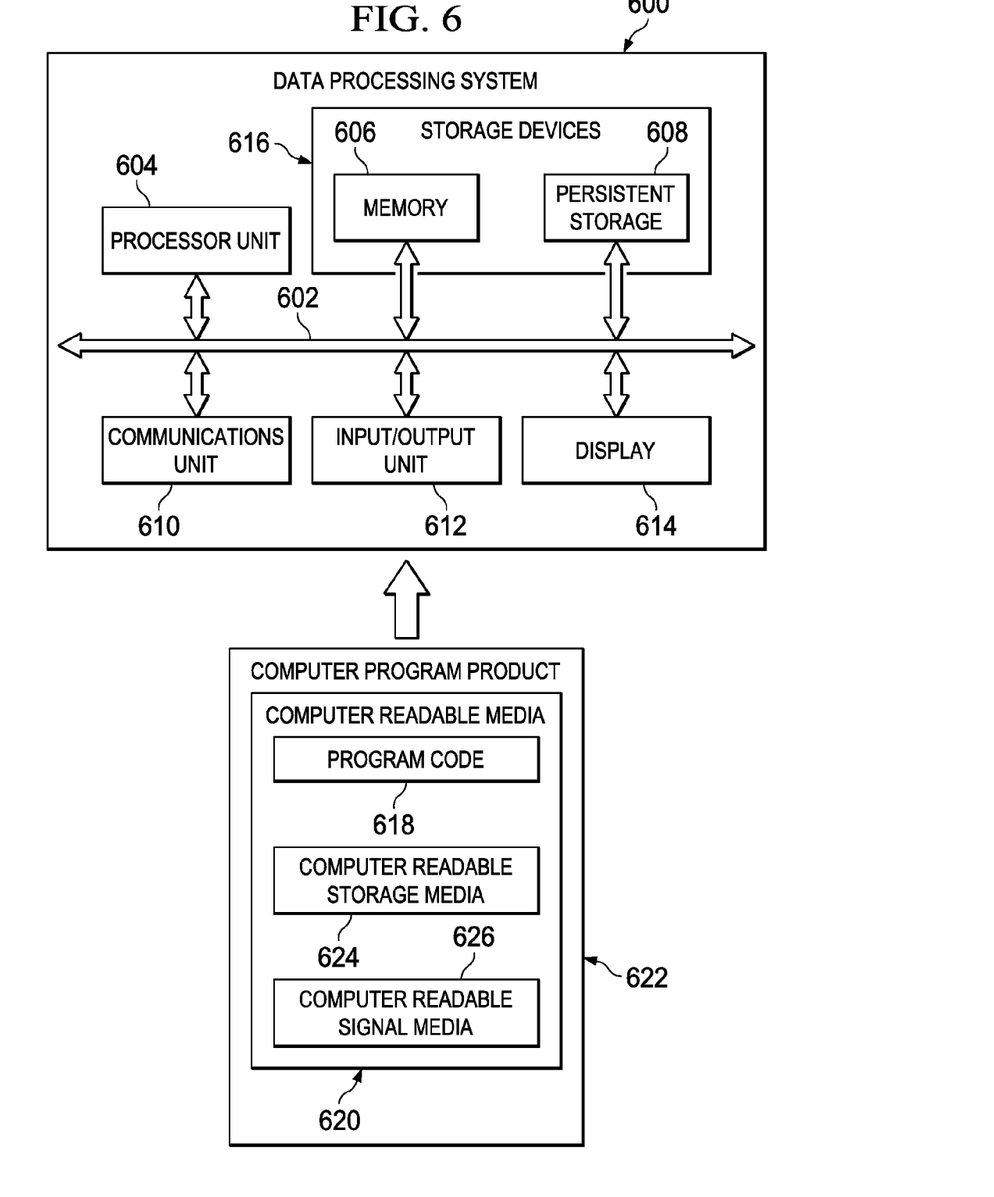
FIG. 6 is an illustration of a data processing system in accordance with an illustrative embodiment.

Turning now to FIG. 6, an illustration of a data processing system is depicted in accordance with an illustrative embodiment. In this illustrative example, data processing system 600 includes communications fabric 602, which provides communications between processor unit 604, memory 606, persistent storage 608, communications unit 610, input/output (I/O) unit 612, and display 614. Data processing system 600 is an example of one implementation for computer system 204, computer system 206, computer system 208, and computer system 234 in network of data processing systems 200 in FIG. 2.

Processor unit 604 serves to run instructions for software that may be loaded into memory 606. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 or run by processor unit 604. The processes of the different embodiments may be performed by processor unit 604 using computer implemented instructions, which may be located in a memory, such as memory 606.

These instructions are referred to as program code, computer usable program code, or computer readable program code that may be read and run by a processor in processor unit 604. The program code in the different embodiments may be embodied on different physical or computer readable storage media, such as memory 606 or persistent storage 608.

Program code 618 is located in a functional form on computer readable media 420 that is selectively removable and may be loaded onto or transferred to data processing system 600 and run by processor unit 604. Program code 618 and computer readable media 620 form computer program product 622 in these examples. In one example, computer readable media 620 may be computer readable storage media 624 or computer readable signal media 626. Computer readable storage media 624 may include storage devices, such as, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage device, such as a hard drive, a thumb drive, or a flash memory, that is connected to data processing system 600. In some instances, computer readable storage media 624 may not be removable from data processing system 600. In these illustrative examples, computer readable storage media 624 is a non-transitory computer readable storage medium.

Alternatively, program code 618 may be transferred to data processing system 200 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 600 is any hardware apparatus that may store data. Memory 606, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606, or a cache, such as found in an interface and memory controller hub that may be present in communications fabric 402.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the invention is a method, data processing system, and computer program product for managing services. A computer identifies information in a number of discussions in a discussion forum. The computer determines that the information is associated with a service. The computer then generates a new request for the service in an absence of a current request for the service.

One or more of the illustrative embodiments take into account information provided by users of a discussion forum to generate service requests. Thus, services can be provided much faster to correct problems. The illustrative embodiments may provide a more efficient problem identification and resolution process. These results may save time and money.

For example, when a problem arises that requires service, the information can be identified on a discussion forum before a service request is actually submitted for the problem. A computer identifies information in a number of discussions in a discussion forum. The computer determines that the information is associated with a service. The computer then generates a new request for the service in an absence of a current request for the service. Thus, the servicing process can be made much more efficient, allowing much faster responsiveness in providing services to resolve problems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing services, the method comprising:

crawling, by a computer, over a number of discussions in an online chat forum to extract information posted by a user of the online chat forum using a domain-specific dictionary of terms;

determining, by the computer, that the information extracted from the number of discussions in the online chat forum is associated with a service of the services, wherein the computer determines that the information extracted from the number of discussions in the online chat forum is associated with the service by using a model that includes a first policy that determines whether the information extracted from the number of discussions in the online chat forum is associated with the service using a set of keywords related to the service;

responsive to the computer determining that a trust level assigned to the user of the online chat forum exceeds a specified threshold, generating, by the computer, a new request for the service in an absence of a current request by the user of the online chat forum for the service, wherein the computer generates the new request by sending a request to the user of the online chat forum for additional information and using the additional information received from the user of the online chat forum to generate the new request, and wherein the trust level assigned to the user is selected using a second policy that utilizes other information posted by the user in the past on the online chat forum that has a history of being accurate information;

sending, by the computer, the new request for the service to a service provider;

receiving, by the computer, data from the service provider indicating that the service is scheduled; and adding, by the computer, new information to the online chat forum indicating the service is scheduled.

2. The method of claim 1, wherein the generating, by the computer, the new request for the service in the absence of the current request by the user of the online chat forum for the service further comprises:

generating, by the computer, the new request in response to determining that the service is authorized; and canceling, by the computer, the new request in response to determining that the service is not authorized.

3. The method of claim 1, further comprising:

adding, by the computer, an indication to the online chat forum that the service for an item has been completed.

4. The method of claim 1, wherein the new information further comprises an indication that the current request exists for the service, and wherein the information extracted from the number of discussions in the online chat forum associated with the service is used to update the current request.

5. The method of claim 1, wherein the crawling, determining, generating, and adding steps are performed throughout a lifecycle of providing the service for an item responsive to the additional information being added to the online chat forum, and wherein the crawling, determining, generating, and adding steps are performed within a threshold of time suitable for responding to the additional information.

6. The method of claim 1, wherein the first policy further uses a predictive analysis algorithm to determine whether the information extracted from the number of discussions in the online chat forum is associated with the service.

7. The method of claim 1, wherein the trust level assigned to the user also is based upon a number of posts to the online chat forum made by the user, a number of service requests made by the user, and a number of service requests made by the user that were resolved.

8. The method of claim 1, wherein the service is to fix a problem associated with a physical item in a computer system.

9. The method of claim 1, further comprising:

identifying, by the computer, the information extracted from the number of discussions in the online chat forum in an additional number of discussions in an additional number of online chat forums.

10. A data processing computer system for managing services comprising:

a bus;

a communications unit connected to the bus;

a storage device connected to the bus, wherein the storage device stores program code; and a processor unit connected to the bus, wherein the processor unit executes the program code to crawl over a number of discussions in an online chat forum to extract information posted by a user of the online chat forum using a domain-specific dictionary of terms; determine the information extracted from the number of discussions in the online chat forum is associated with a service of the services, wherein the processor unit determines that the information extracted from the number of discussions in the online chat forum is associated with the service by using a model that includes a first policy that determines whether the information extracted from the number of discussions in the online chat forum is associated with the service using a set of keywords related to the service; generate a new request for the service in an absence of a current request by the user of the online chat forum for the service in response to determining that a trust level assigned to the user of the online chat forum exceeds a specified threshold, wherein the new request is generated by sending a request to the user of the online chat forum for additional information and using the additional information received from the user of the online chat forum to generate the new request, and wherein the trust level assigned to the user is selected using a second policy that utilizes other information posted by the user in the past on the online chat forum that has a history of being accurate information; send the new request for the service to a service provider; receive data from the service provider indicating that the service is scheduled; and add new information to the online chat forum indicating the service is scheduled.

11. A computer program product for managing services comprising:

a computer readable storage device;

program code, stored on the computer readable storage device, for crawling over a number of discussions in an online chat forum to extract information posted by a user of the online chat forum using a domain-specific dictionary of terms;

program code, stored on the computer readable storage device, for determining that the information extracted from the number of discussions in the online chat forum is associated with a service of the services, wherein the information extracted from the number of discussions in the online chat forum is determined to be associated with the service by using a model that includes a first policy that determines whether the information extracted from the number of discussions in the online chat forum is associated with the service using a set of keywords related to the service;

program code, stored on the computer readable storage device, for generating a new request for the service in an absence of a current request by the user of the online chat forum for the service in response to determining that a trust level assigned to the user of the online chat forum exceeds a specified threshold, wherein the new request is generated by sending a request to the user of the online chat forum for additional information and using the additional information received from the user of the online chat forum to generate the new request, and wherein the trust level assigned to the user is selected using a second policy that utilizes other information posted by the user in the past on the online chat forum that has a history of being accurate information;

program code, stored on the computer readable storage device, for sending the new request for the service to a service provider;

program code, stored on the computer readable storage device, for receiving data from the service provider indicating that the service is scheduled; and program code, stored on the computer readable storage device, for adding new information to the online chat forum indicating the service is scheduled.

\* \* \* \* \*